United States Patent [19]

Collins

[11] Patent Number: 5,345,399

[45] Date of Patent: Sep. 6, 1994

[54] SYSTEM AND METHOD FOR MONITORING AND CONTROLLING THE WIDTH OF A PRODUCT

[75] Inventor: Steven L. Collins, Yardley, Pa.

[73] Assignee: Union Camp Corporation, Princeton, N.J.

[21] Appl. No.: 909,554

[22] Filed: Jul. 6, 1992

[51] Int. Cl.⁵ .......................................... G01B 11/02
[52] U.S. Cl. ................................... 364/563; 364/469
[58] Field of Search ................... 364/563, 474.05, 469; 250/557, 559, 548

[56] References Cited

U.S. PATENT DOCUMENTS

| | | | |
|---|---|---|---|
| 3,459,841 | 8/1969 | Seiler | 264/40.6 |
| 4,140,460 | 2/1979 | Carlsen | 425/140 |
| 4,189,288 | 2/1980 | Halter | 425/72 |
| 4,192,637 | 3/1980 | Chong | 425/140 |
| 4,243,363 | 1/1981 | Mulcahy | 425/140 |
| 4,246,212 | 1/1981 | Upmeier et al. | 264/40.1 |
| 4,325,897 | 4/1982 | Zerle et al. | 264/40.3 |
| 4,330,501 | 5/1992 | Jones et al. | 264/566 |
| 4,335,966 | 10/1982 | Sweeney et al. | 425/140 |
| 4,339,404 | 7/1982 | Upmeier et al. | 264/40.1 |
| 4,377,540 | 3/1983 | Cluett et al. | 264/23 |
| 4,606,879 | 8/1986 | Cerisano | 264/565 |
| 4,663,097 | 5/1987 | Hatfield | 264/40.7 |
| 4,699,580 | 10/1987 | Co | 425/140 |
| 4,750,874 | 6/1988 | Keim | 425/72.1 |
| 4,891,528 | 1/1990 | Kuecker et al. | 250/557 |
| 4,984,896 | 1/1991 | Flämig | 250/559 |
| 5,024,156 | 6/1991 | Hank et al. | 250/548 |
| 5,224,049 | 6/1993 | Mushabac | 364/474.05 |

OTHER PUBLICATIONS

Kündig Control Systems Operating Instructions for FE-6 Width Measuring Unit (1st Edition 1986).
J. Callari, "Tight Layflat Offered by Bubble-Control System", Plastics World, Apr. 1991.
Allen-Bradley, Bulletin 2804 Smart Linear Sensor (Cat. No. 2804-SLS1, -SLS2) 1990 (no month).

Primary Examiner—Kevin J. Teska
Assistant Examiner—Thomas Peeso
Attorney, Agent, or Firm—Woodcock Washburn Kurtz Mackiewicz & Norris

[57] ABSTRACT

A system for monitoring and controlling the width of a product such as a sheet, film or tube includes, in the preferred embodiment, a line scan camera having a one-dimensional array of charge-coupled devices ("CCD's") for monitoring the width of the product. The CCD's develop an analog charge value which is proportional to the intensity of any light falling thereon; the analog nature of the CCD's allows subelement interpolation based on the voltage charge of two adjacent elements. This permits product width to be measured more accurately than was heretofore possible with electromechanical or photoelectric type systems.

13 Claims, 5 Drawing Sheets

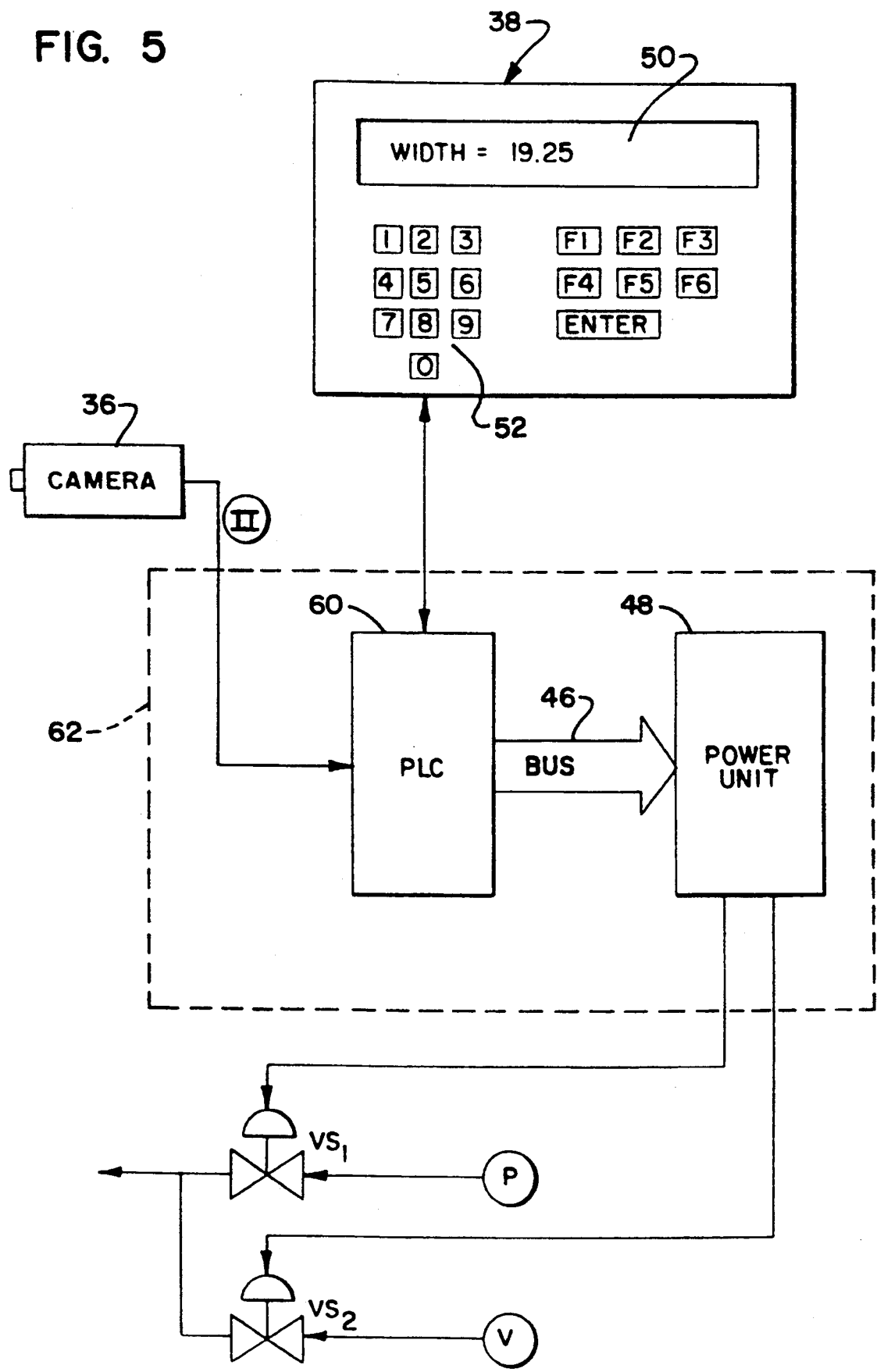

SYSTEM AND METHOD FOR MONITORING AND CONTROLLING THE WIDTH OF A PRODUCT

FIELD OF THE INVENTION

This invention relates to a system and a method for monitoring and controlling the size of a product such as a sheet, film or tube during a manufacturing process. A system according to the invention provides a higher degree of accuracy with a given number of sensing elements than was heretofore possible.

DESCRIPTION OF THE PRIOR ART

One known process for manufacturing polymeric products such as sheet, film or tube involves forcing a liquid polymer or resin under pressure through an extrusion die. In some instances, the liquid polymer or resin is extruded through a circular or oval die orifice to form a tube product, which may subsequently be formed into a flat film or sheet by rolling or pressing.

Commonly, a gas such as air is then introduced into the tube extrusion, most often through the die itself. Inflation of the tube, accompanied by stretching of the tube in an axial or longitudinal direction, biaxially orients the polymer molecules to maximize the mechanical properties of the resulting film. If desired, the opposite or leading end of the inflated tube is then passed through a pair of cooperating rotatable rollers to form a flat film or sheet. During this process, the eventual width of the flat film is largely determined by the amount of air that is introduced into the tube at the die orifice.

Various systems are disclosed in the prior art for monitoring the width of the film and adjusting the amount of air which is introduced into the tube in response to the measured width. One early example of such a system is disclosed in U.S. Pat. No. 3,459,841 to Seiler. That system utilized a mechanical lever sensor to monitor the width of the film product. A subsequent system is disclosed in U.S. Pat. No. 4,192,637 to Chong. The Chong system used photodetectors, which were arranged along one or both edges of the film product to detect fluctuations in its width.

Systems such as the one disclosed in the Chong patent usually rely on a linear array of photo-diodes or photo-transistors, which switch between a conducting ("on") and a non-conducting ("off") condition depending upon the amount of light that falls thereon. Unfortunately, those systems can only be as accurate as the spacing between adjacent photodetectors. For a system that requires a high degree of accuracy, a high concentration of photodetectors is required. In some applications, it is difficult to achieve the required concentration of photodetectors. In any event, the cost of such a system increases according to the number of photodetectors that is required.

It is clear that there has existed a long and unfilled need in the prior art for a system and method for optically monitoring and controlling the width of a product such as a sheet, film or tube during a manufacturing process which provides a higher degree of accuracy with a given number of sensing elements than was heretofore possible.

SUMMARY OF THE INVENTION

The present invention relates to a system and method for monitoring and controlling the width of a product such as a sheet, film or tube during a manufacturing process which provides a higher degree of accuracy with a given number of sensing elements than was heretofore possible.

A system according to a first aspect of the invention includes a sensor for monitoring the width of the product, the sensor including a plurality of sensing elements for detecting a property which can be associated with a presence or an absence of the product; and a controller in communication with the sensor for adjusting the manufactured width of the product in response to information which is provided to the controller from the sensor; wherein the sensing elements in the sensor are of the type which can measure an analog value of the detected property instead of an on/off or digital value, thereby permitting the system to obtain a higher degree of accuracy with a given number of sensing elements than was heretofore possible.

A system according to a second aspect of the invention includes an extrusion die for forming a polymeric substance supplied to the die under pressure into a tubular product defining an interior space; a pressure control system associated with the extrusion die for controlling gas pressure within the interior space, thereby controlling expansion of the tubular product after the tubular product is formed by the extrusion die; a roller for flattening the tubular product into a flat sheet having a width; and a system for monitoring and controlling the width of the flat sheet, the monitoring and controlling system including a sensor for monitoring the width of a product, the sensor having a plurality of sensing elements for detecting a property which can be associated with a presence or an absence of the product; and a controller in communication with the sensor for adjusting the manufactured width of the product in response to information which is provided to the controller from the sensor; wherein the sensing elements in the sensor are of the type which can measure an analog value of the detected property instead of an on/off or digital value, thereby permitting the system to obtain a higher degree of accuracy with a given number of sensing elements than was heretofore possible.

According to a third aspect of the invention, a method for monitoring and controlling the width of a product such as a sheet, film or tube during a manufacturing process, includes the steps of (a) sensing a property which can be associated with a presence or an absence of the product at spaced intervals along a path where the product is expected to be, the sensing being of an analog value of the detected property; (b) calculating the width of the product based on the sensed analog values; and (c) adjusting the manufactured width of the product in response to the calculated width.

BRIEF DESCRIPTION OF THE DRAWINGS

FIG. 5 is a schematic diagram representing a system constructed according to a second preferred embodiment of the invention.

DETAILED DESCRIPTION OF THE PREFERRED EMBODIMENT

Figure 1:
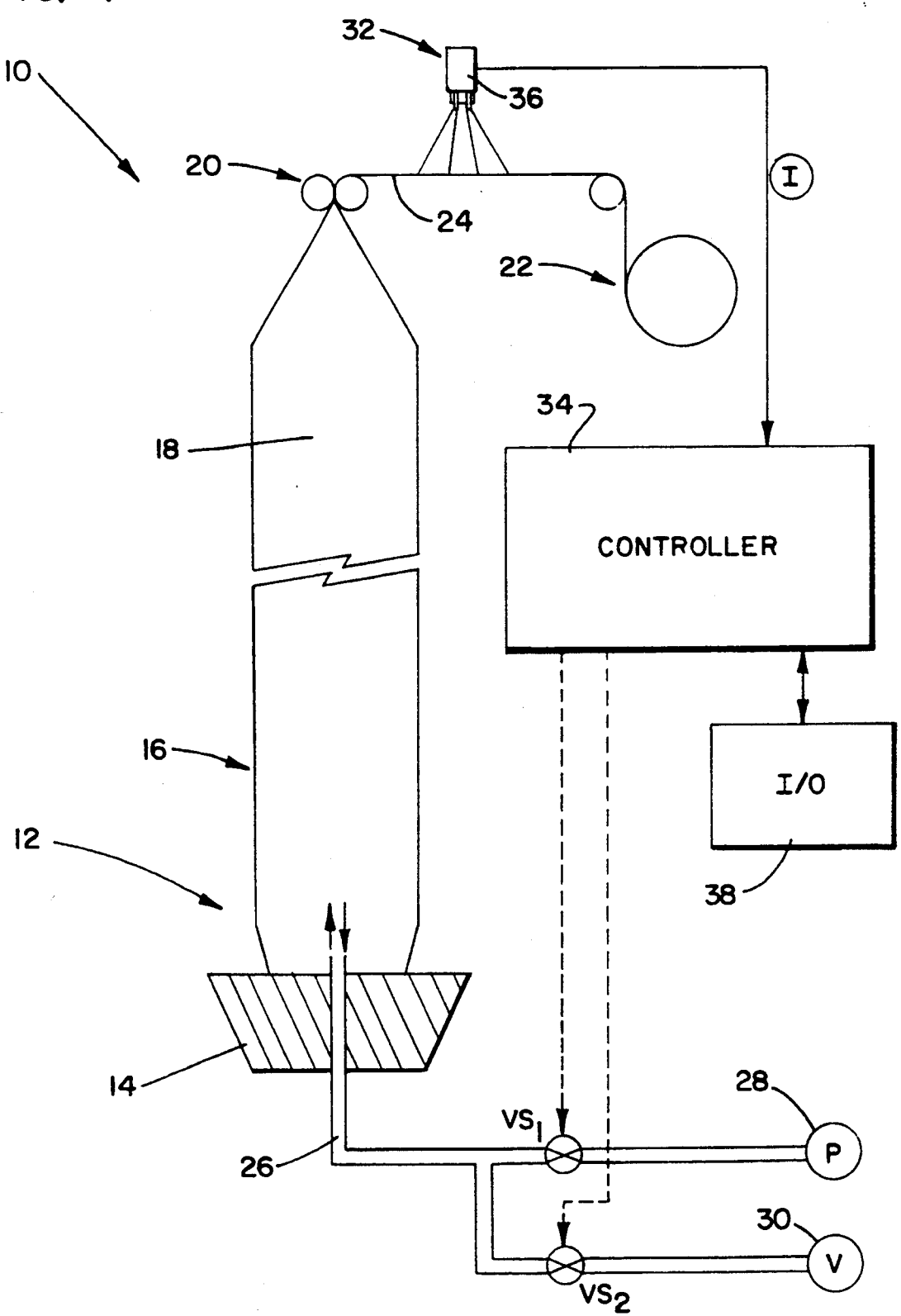
FIG. 1 is a schematic representation of a system for monitoring and controlling the width of a product such as a sheet, film or a tube during a manufacturing process according to a first preferred embodiment of the invention.

Referring now to the drawings, wherein like reference numerals designate corresponding structure throughout the views, and referring in particular to FIG. 1, a system 10 for monitoring and controlling the width of a product such as a sheet, film or tube during a manufacturing process includes a manufacturing system 12 having an extrusion die 14 which is, as conventionally known, associated with a polymerization reactor or other source of pressurized liquid polymer so as to form an extruded product 16 shaped as a tube 18. As is well known in the art, tube 18 is tensioned by and passed through a nip roller pair 20 to form a layflat product or film 24, which is eventually advanced into a storage roll 22 for further handling and distribution. As is also conventional, extrusion die 14 is in communication with an air passage 26 for introducing or extracting a gas such as air into or from the interior of the tubular portion 18 of extruded product 16. Air passage 26 may be communicated with a source 28 of pressurized gas upon the opening of a first solenoid actuatable valve $VS_1$. Air passage 26 can alternatively be communicated with a source of vacuum 30 upon the opening of a second solenoid actuatable valve $VS_2$.

Referring again to FIG. 1, it will be seen that system 10 includes a sensor 32 for monitoring the width of lay flat product 24, and a controller 34 which is in communication with the sensor 32. In the preferred embodiments, sensor 32 is a line scan video camera 36 which includes a plurality of sensing elements for detecting a property which can be associated with a presence or an absence of the lay flat product 24. Line scan camera 36 will be discussed in greater detail below.

As is further shown in FIG. 1, system 10 further includes an input/output device 38, which is in communication with controller 34 to provide a human control interface to the system 10. Preferably, input/output device 38, which is discussed in greater detail below, allows an operator to view the currently measured film width and provides feedback of control status, control parameters and calibration parameters which are used in the operation of the system 10.

Figure 2:
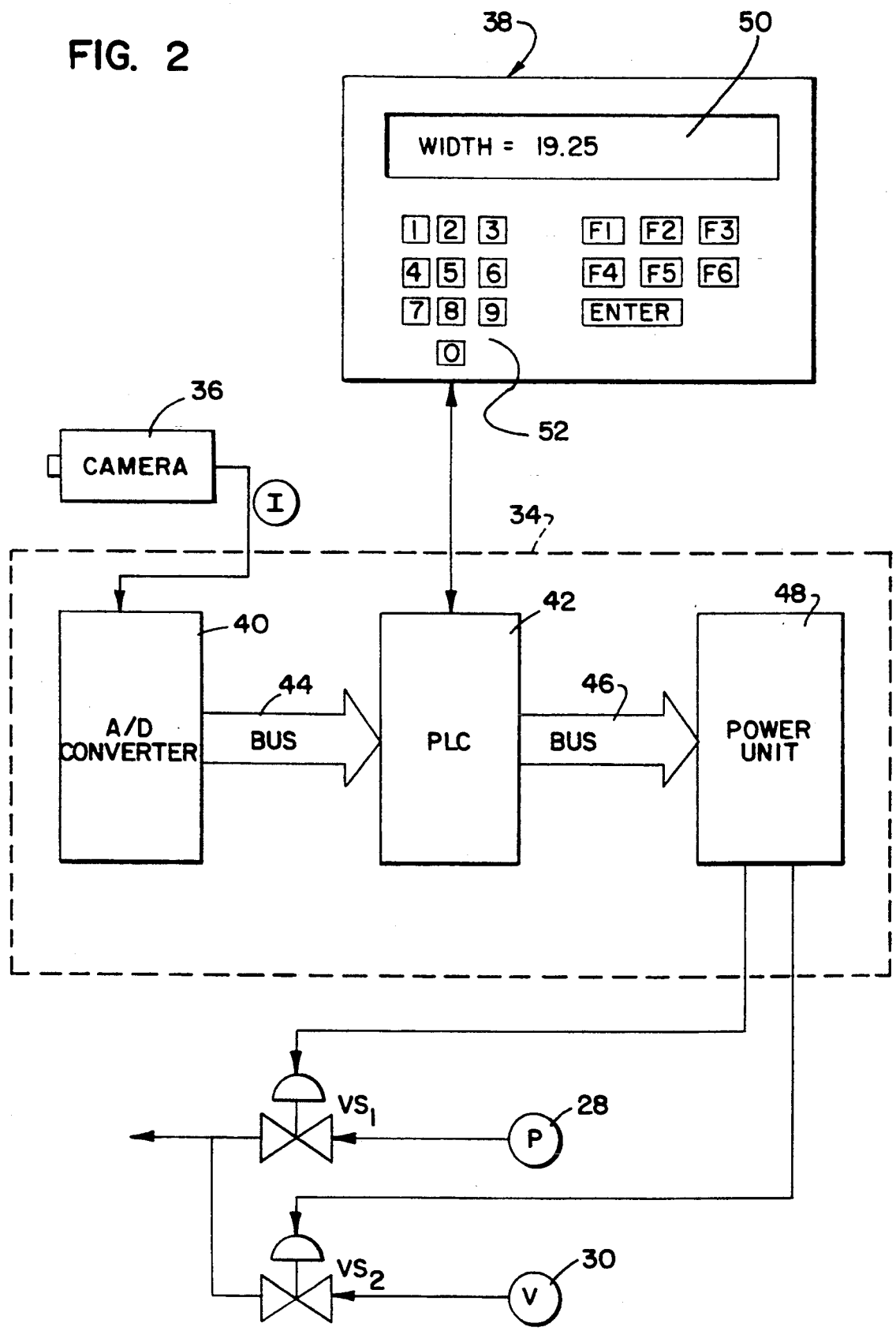
FIG. 2 is a schematic depiction of a portion of the system illustrated in FIG. 1.

Referring now to FIG. 2, it will be seen that controller 34 includes an analog to digital converter 40 which receives an analog signal from line scan camera 36 and converts it to a digital signal which is communicated to a program logic controller ("PLC") 42 via a data bus 44. The PLC 42 is further in two-way communication with the input/output unit 38. As will be seen in FIG. 2, input/output unit 38 includes a readout display 50 and a keyboard or operator input mechanism 52. The keyboard 52 or operator input mechanism allows an operator to change the desired target film width, control group responses and width calibration adjustments. The readout display 50 allows an operator to view the currently measured film width and provides feedback of control status (automatic or manual), control parameters, and calibration parameters.

Referring again to FIG. 2, it will be seen that PLC 42 communicates with a power unit 48 via a second data bus 46. Power unit 48 is constructed to receive a control signal from PLC 42 and to translate such control signal into a power impulse signal which is powerful enough to actuate, selectively, one of the solenoid actuatable valves $VS_1$ or $VS_2$.

Figure 3:
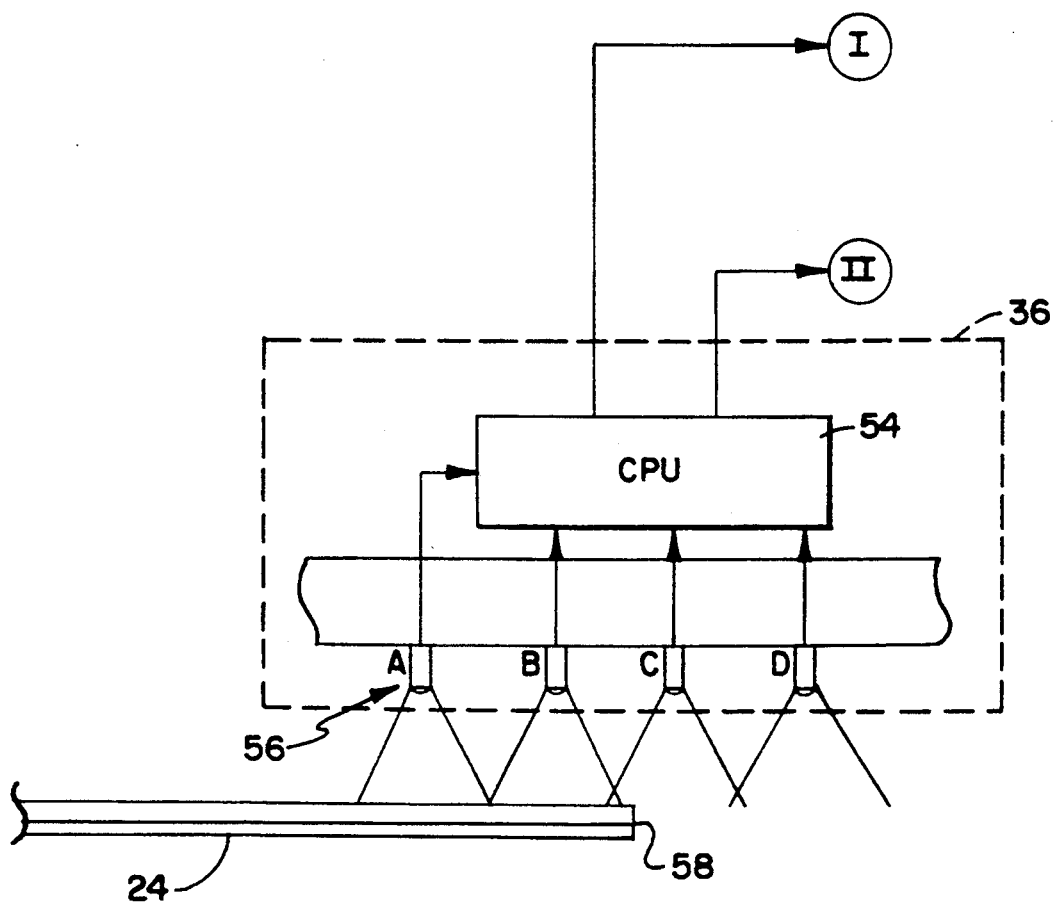
FIG. 3 is a schematic depiction of a second aspect of the system depicted in FIG. 1.
Figure 4:
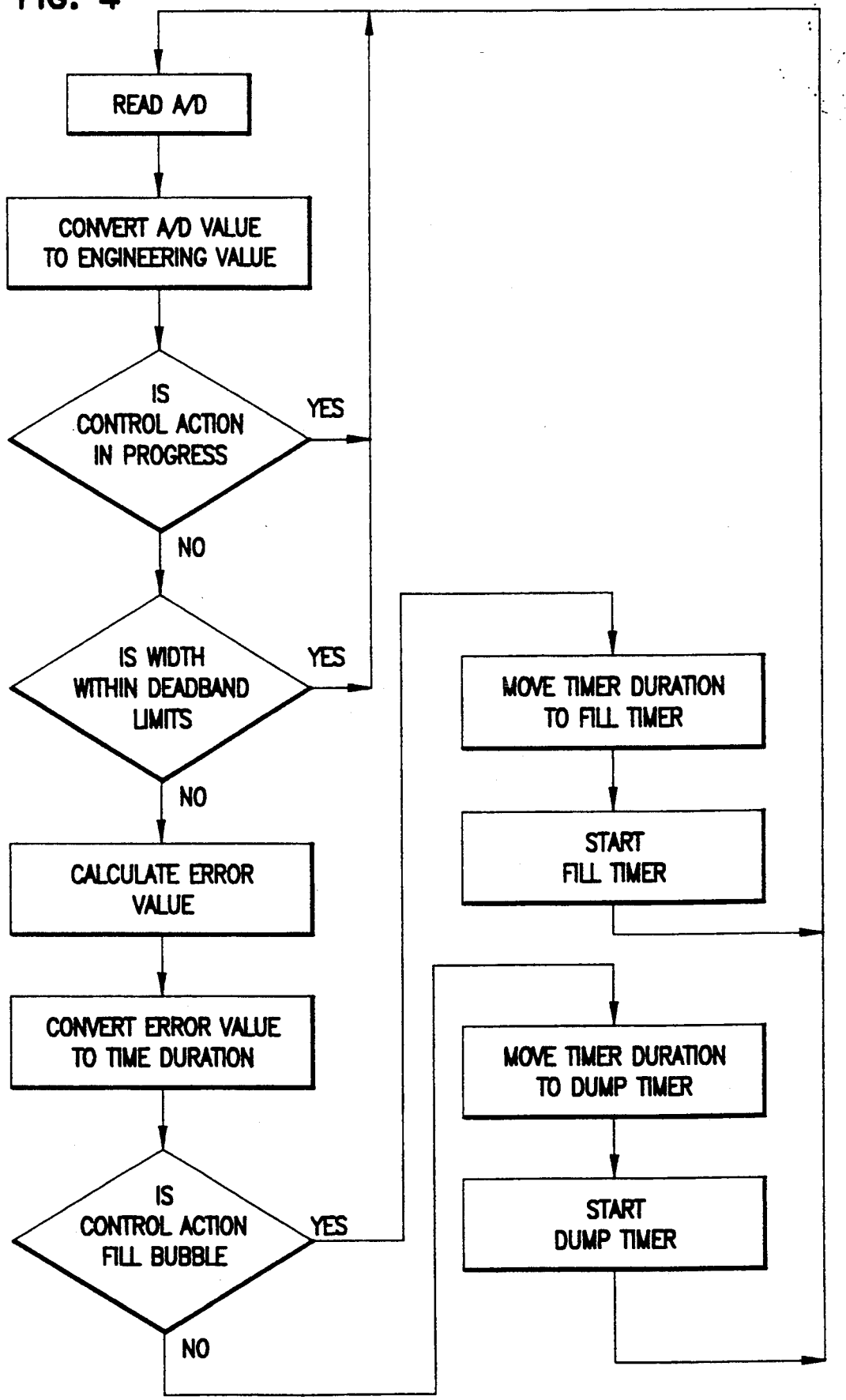
FIG. 4 is a flow chart depicting operation of the system depicted in FIGS. 1-3.

Referring briefly to FIG. 3, it will be seen that line scan camera 36 includes a plurality of sensing elements 56. According to the invention, sensing elements 56 are of the type which can measure an analog value of a property which can be associated with a presence or an absence of lay flat product 24, instead of an on/off or digital value, which permits the system 10 to obtain an higher degree of accuracy with a given number of sensing elements than was possible with prior art systems. In the preferred embodiment, sensing elements 56 are charge-coupled devices ("CCD's") which will accumulate a charge according to an amount of light that is incident thereon. In FIG. 3, the CCD elements are depicted as elements A, B, C and D, each of which has a field of view which is determined by the shape of the lens which is provided on each CCD pixel. In the preferred embodiment, the CCD's A, B, C, D are arranged in a linear array, which in the most preferred embodiment is a 2048×1 CCD array element. Although FIG. 3 depicts the CCD array to be positioned over only one edge 58 of the lay flat product 24, it should be understood that the preferred embodiment is such that the CCD array will overlie both edges of the product 24. Each of the CCD pixels A, B, C, D provide input to a CPU 54 in the camera 36, as is shown schematically in FIG. 3.

Most preferably, the line scan camera 36 is embodied as that which is commercially available from Allen-Bradley as the Smart Linear Sensor TM catalog number 2804-SLS1 or SLS2. The controller 34 is most preferably a model 1771 rack, also available from Allen-Bradley, wherein the analog to digital converter 40 is preferably a model 1771-IFE unit, the PLC 42 is preferably a model 1786-LT5/15 processor and power unit 48 is preferably a model 1771-OAD digital output 110VAC unit, also available from Allen-Bradley. Input output unit 38 is preferably an Allen-Bradley RediPANEL TM, which is also commercially available. To the extent that such systems are publicly known, their disclosure is hereby incorporated by reference as if set forth fully herein.

In operation, a system 10 according to the embodiment of FIGS. 1–4 will operate as follows. The CCD pixels in line scan camera 36 will accumulate charges, the voltage value of which is proportional to the amount of light which falls upon each respective pixel. Thus, provided that there is a baseline level of illumination surrounding system 10, the pixels which are positioned above lay flat product 24 would be expected to accumulate a voltage charge at a different rate than those pixels which overlie open space. The voltage charge of each pixel is cleared periodically, and the voltage charge value is reported to the CPU 54 in line scan camera 36. In the condition which is illustrated in FIG. 3, the edge 58 of lay flat product 24 lies between CCD pixels B and C. CCD pixel A is positioned so that its entire field of view overlies lay flat product 24, and CCD pixel D is positioned so that its entire field of view overlies open space. In this condition, CCD pixel A would be expected to accumulate a voltage charge at a first rate, CCD pixel D would be expected to accumulate a voltage charge at a second, different rate, which could be greater or less than the rate that a charge is accumulated in CCD pixel A, depending upon the level of background illumination and the color and reflectability of lay flat product 24. The rate at which a voltage charge accumulates in CCD pixels B and C would be expected to be equal to or fall between the rates at which a voltage charge accumulates in CCD pixels A and D. By analyzing the rate at which a charge accumulates in CCD pixels B and C, the precise position of the edge 58 with respect to the linear array of sensing elements 56 can be determined through an interpolation process, which is preferably performed in the CPU 54 of line scan camera 36. The same process occurs with the CCD's that are positioned over the opposite edge of the product. The CPU 54 thus analyzes the charge values which are periodically received from the sensing elements 56, and generates an analog signal I which is indicative of the width of the product. This signal I is fed to the analog to digital converter 40, which converts the information to a digital value and passes it onto PLC 42 via bus 44. This step is depicted as "read A/D" in the flow chart which is provided in FIG. 4. PLC 42 converts this data to an engineering value, which is in standard engineering units, such as inches or millimeters. PLC 42 then checks to determine whether a control action is in process as a result of a previous measurement. If it is, the process is aborted, until the next width measurement is reported to A/D converter 40 by line scan camera 36. If a control action is not in progress, PLC 42 then checks to determine whether the width of the lay flat product 24, as it is expressed in the engineering value, is within a dead band limit. The desired width of lay flat product 24 and the dead band tolerance is set by an operator through entry by the keyboard 52 of input/output unit 38. Input/output 38 reports these values to the PLC 42. If the measured width is within dead band limits, the process is terminated until the next reading is received. If the measured width is outside the dead band limits, the difference between the measured value and the desired width is calculated by the PLC 42. The PLC 42 then mathematically determines the length of time that either pressure source 28 or vacuum source 30 needs to be communicated with air passage 26 to rectify the error in width. If the measured width of lay flat product 24 is less than the desired width, the calculated time value is moved within PLC 42 to an internal fill timer. The internal fill timer will then initiate a signal which is transmitted to power unit 48 via bus 46, and power unit 48 will instruct solenoid actuatable valve $VS_1$ to open, thereby communicating pressure source 28 with the air passage 26 to introduce air into the space within the extruded product 16. This action continues until the fill timer within PLC 42 instructs power unit 48 to close valve $VS_1$. Similarly, if the width of product 24 is greater than the desired width, the calculated time value is moved into an internal dump timer in PLC 42. The dump timer will then instruct power unit 48 to open solenoid actuatable valve $VS_2$ to communicate vacuum source 30 with air passage 26. This process, again, will continue until the dump timer instructs power unit 48 to close valve $VS_2$.

A second embodiment of the invention is schematically depicted in FIG. 5 of the drawings. Referring briefly to FIG. 5, it will be noted that CPU 54 of line scan camera 36 is further adapted to communicate via a second signal II. Signal II is a digital signal, which represents, in binary form, the voltage charge accumulated at each of the sensing elements 56. The digital signal II is fed directly into a serial communication module 64 portion of controller 62, as may be seen in FIG. 5. Serial communication module 64 translates the protocol of the line scan camera 36 into that of the PLC 60, and vice versa. The embodiment of FIG. 5 thus obviates the need for an analog to digital converter in the controller 62. In this embodiment, PLC 60 is in two-way communication with the line scan camera 36 via the module 64.

In the most preferred embodiment, serial communication module 64 is a RS-232 or RS-422 serial communications interface, obtainable from Allen-Bradley.

In operation, the controller 62 operates in a manner which is identical to that described above with reference to controller 34, except that the PLC 60 can, in response to operator input or otherwise, change certain parameters of the line scan camera 36 dynamically, on-line. Those parameters include edge detection threshold sensitivity, light sensitivity, and object foreground to background configuration. This capability permits the system to compensate for changed process conditions.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A lay flat width control system for monitoring and controlling the width of an extruded polymeric product, comprising:
    an extrusion die for forming a polymeric substance supplied to said extrusion die under pressure into a tubular product defining an interior space;
    pressure control means associated with said extrusion die for controlling gas pressure within the interior space, thereby controlling expansion of the tubular product after the tubular product is formed by said extrusion die;
    a roller for flattening the tubular product into a lay flat product having a width defined by first and second edges of said lay flat product, and
    means for monitoring and controlling the width of said lay flat product, said monitoring and controlling means comprising:
    a sensor for monitoring the width of said lay flat product, said sensor comprising a plurality of sensing elements of a type which can measure an analog value of a property that can be associated with a presence or an absence of said lay flat product; and
    a controller in communication with said sensor for adjusting the interior space of the tubular product in response to information which is provided to said controller from said sensor; thereby permitting said system to control the width of the lay flat product to a higher degree of accuracy with a given number of sensing elements than was heretofore possible.

2. A system according to claim 1, wherein said sensor is a line-scan camera.

3. A system according to claim 1, wherein at least a number of said sensing elements comprise a charge-coupled device ("CCD"), which accumulates a charge according to an amount of light incident thereon.

4. A systems according to claim 3, wherein said charge-coupled devices are arranged in a one-dimensional array in said sensor.

5. A system according to claim 1, further comprising means for receiving said analog values from said sensing elements and for analyzing said analog values interpolatively, whereby the precise width of the lay flat product can be determined, even when the edges of the lay flat product are between adjacent sensing elements.

6. A system according to claim 5, wherein at least a number of said sensing elements comprise a charge-coupled device which accumulates a charge according to an amount of light which is incident thereon.

7. A system according to claim 6, wherein said charge-coupled devices are arranged in a one-dimensional array in said sensor.

8. A system according to claim 1, wherein said sensor is adapted to send an array signal to said controller which is proportional to the width of the lay flat product.

9. A system according to claim 8, wherein the current of said signal is varied in proportion to the sensed width of the lay flat product.

10. A method for monitoring and controlling the width of a product such as a sheet, film or tube during a manufacturing process, comprising:
  (a) sensing a property which can be associated with a presence or an absence of the product at spaced intervals along a path where the product is expected to be, said sensing being of an analog value of the detected property;
  (b) calculating the width of the product based on said sensed analog value and
  (c) adjusting the manufactured width of the product in response to said width that is calculated in step (b).

11. A method according to claim 10, wherein step (a) is performed by sensing light level.

12. A method according to claim 11, wherein the light level sensing is performed by using an array of charge-coupled devices.

13. A method according to claim 10, wherein step (b) comprises interpolating the analog values which are sensed at adjacent locations along the path having spaced intervals, whereby the width of the product may be measured to a higher degree of accuracy then was heretofore possible.

* * * * *